United States Patent [19]

Mortenson

[11] Patent Number: 5,207,439
[45] Date of Patent: May 4, 1993

[54] IMPROVEMENTS IN HAND TRUCKS WITH PIVOTALLY CONNECTED, SPREADABLE, WHEEL-SUPPORTED, AUXILIARY SUPPORT FRAMES

[75] Inventor: Carl N. Mortenson, Midland, Mich.
[73] Assignee: Magline, Inc., Pinconning, Mich.
[21] Appl. No.: 839,857
[22] Filed: Feb. 21, 1992
[51] Int. Cl.⁵ .............................................. B62B 3/02
[52] U.S. Cl. ................................... 280/47.2; 280/641
[58] Field of Search ................... 280/47.21, 47.2, 645, 280/641

[56] References Cited

U.S. PATENT DOCUMENTS

| | | | |
|---|---|---|---|
| 2,249,123 | 7/1941 | Fleck et al. | 280/645 |
| 3,064,990 | 11/1962 | Salvucci | 280/47.2 |
| 3,850,441 | 11/1974 | Peters et al. | 280/47.2 |
| 3,997,182 | 12/1976 | Mortenson | 280/47.21 |
| 4,681,330 | 7/1987 | Misana | 280/47.2 |
| 4,762,333 | 8/1988 | Mortenson | 280/47.21 |
| 5,042,827 | 8/1991 | Mortenson | 280/47.21 |

FOREIGN PATENT DOCUMENTS

| | | | |
|---|---|---|---|
| 1802248 | 5/1970 | Fed. Rep. of Germany | 280/47.21 |
| 2043547 | 10/1980 | United Kingdom | 280/47.2 |

OTHER PUBLICATIONS

Magline, Inc. brochure.

Primary Examiner—David M. Mitchell
Attorney, Agent, or Firm—Learman & McCulloch

[57] ABSTRACT

A hand truck with an upright main frame and a handle part at its upper end has a forwardly extending nose at its lower end for supporting a load thereon which rests back against the main frame when the main frame is in vertically rearwardly tilted position, and a wheel and axle assembly at its lower end to support it for travel. An auxiliary support frame, having a ground engaging wheel at its lower end is pivotally connected near its upper end to the main frame for movement from the main frame to a spread position. A rearwardly extendible first link structure, pivotally connected to the main frame, is hingedly connected to a second link structure, pivotally connected to the auxiliary frame. Force exerting, compressible spring mechanism, connected pivotally to one of the link structures and to one of the main frame and attachment frame, exerts a moment arm force moving the link structures through an in-line position to locked over-center position when the auxiliary frame is spread, and positively resists inadvertent movement of the link structures out of locked position, while positively forcing the link structures and auxiliary frame to folded position once the link structures have been moved back from over-center position and through the in-line position.

11 Claims, 2 Drawing Sheets

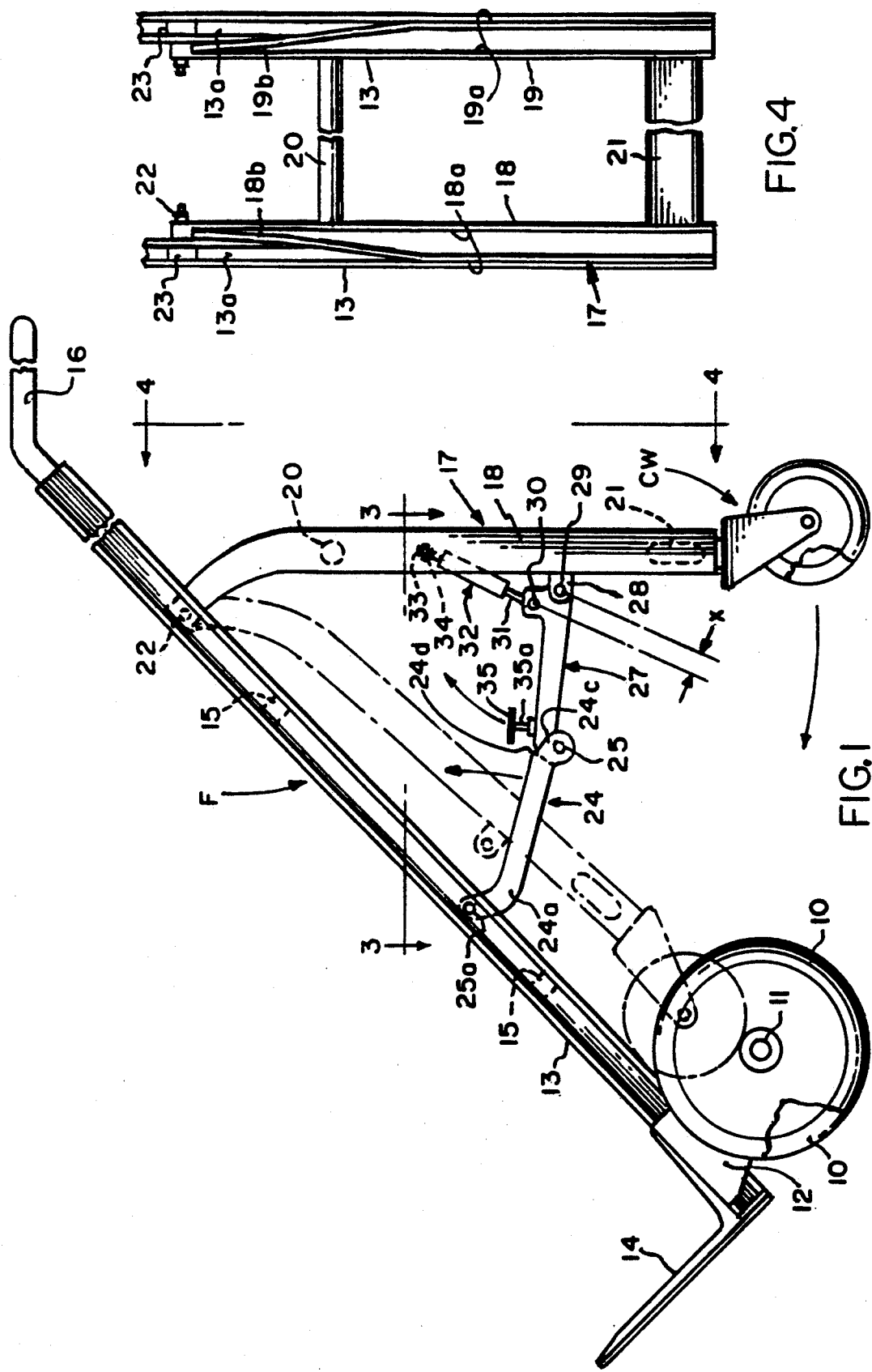

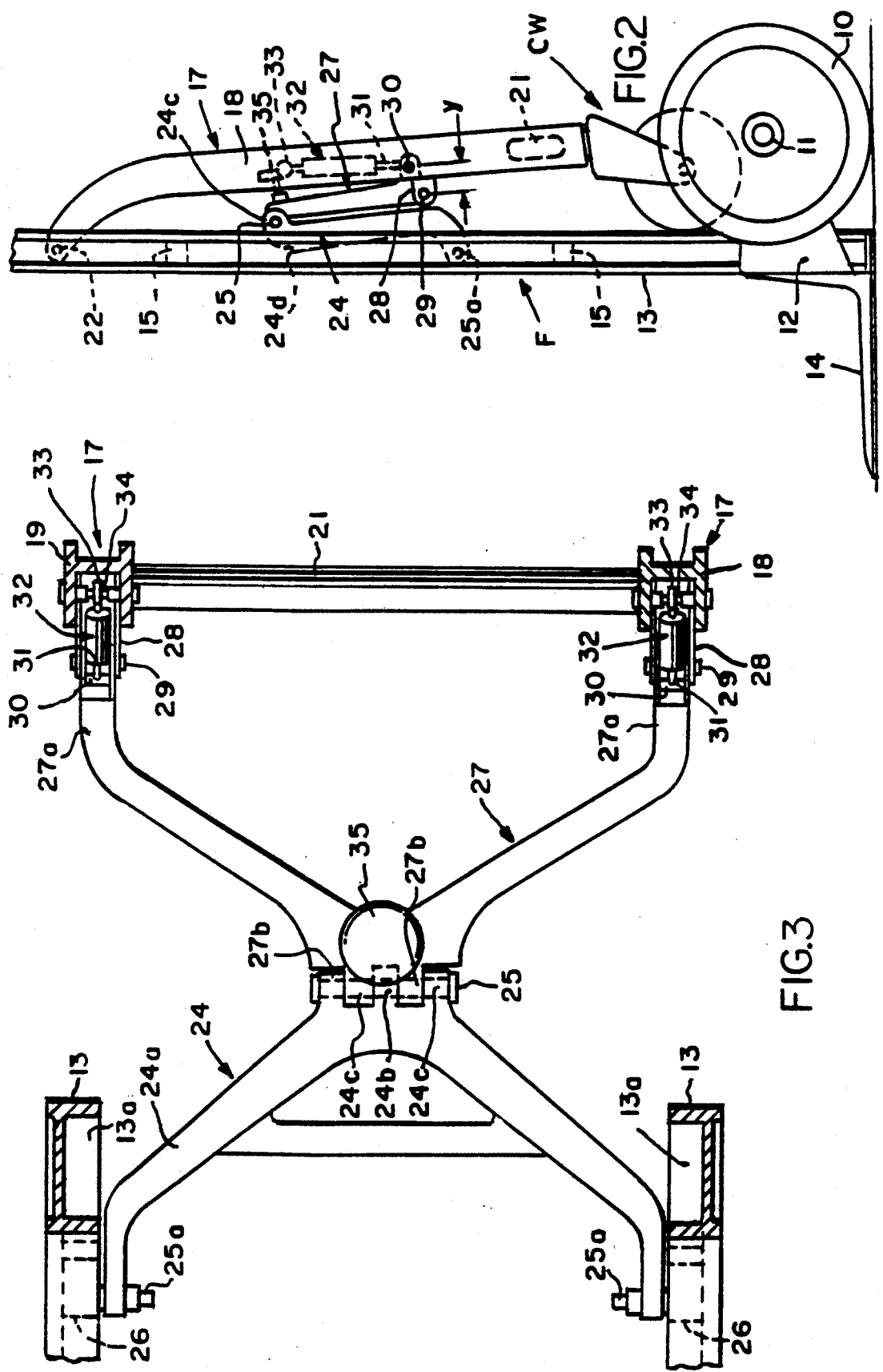

IMPROVEMENTS IN HAND TRUCKS WITH PIVOTALLY CONNECTED, SPREADABLE, WHEEL-SUPPORTED, AUXILIARY SUPPORT FRAMES

BACKGROUND OF THE INVENTION

This invention relates to hand trucks, and more particularly to certain new and useful improvements in two-wheeled hand trucks which are useable in the normal mode of operation to transport loads, while also having a load carrying, spreadable auxiliary support structure which permits them to be used to transport bulkier and/or heavier loads when the occasion arises.

Applicant's assignee, and others, have for years marketed a two-wheel hand truck which has a wheel-supported auxiliary support frame of this character, pivotally connected to the hand truck at its upper end. Near its lower end, it is connected by accordion links to the wheel brackets, so that it can be moved from an inoperative folded position adjacent the main frame of the hand truck to a spread operative position. This hand truck auxiliary support frame is maintained in the folded position and in the spread position by frictional resistance to movement. In the spread position, a bar spanning the link which connects to the brackets is utilized to overlie the link structure connected to the attachment frame to prevent any substantial movement of the links beyond a slightly over-center position. The auxiliary support frame, once in spread position, is not easy to release and reposition, and considerable physical force is required in all phases of the operation to move the attachment frame to and from spread position. Typically, in the spread position, both locking and unlocking, need to be effected by employing the leg and foot of the user.

SUMMARY OF THE INVENTION

The present invention is concerned with a hand-propelled, load-carrying hand truck having an upright main frame with a handle part or parts at its upper end and a forwardly extending nose platform at the lower end of the main frame for supporting a load which can rest back against the main frame when the main frame is in vertically rearwardly tilted position. The usual wheel and axle assembly is connected to the lower end of the frame by brackets which attach to the lower end of the main frame. For supporting heavier and bulkier loads, with the main frame more vertically tilted, an auxiliary attachment frame, having at least one ground engaging member or wheel at its lower end, and preferably two caster wheels, is pivotally connected near its upper end to an upper portion of the main frame for movement out away from the general plane of the main frame to a spread, diverged position with respect to the main frame. The rearwardly extendible first link structure pivotally connects to the main frame at a location spaced upwardly from the wheels, and a forwardly extendible second link structure, which is pivotally connected to the attachment frame, pivotally connects to the first link structure. When the attachment frame is folded to the main frame, the first and second link structures are in a generally parallel folded position, and when the attachment frame is in the spread position they move to an in-line position, and then on to an over-center position.

The hand cart of the present invention incorporates force-exerting, compressible spring mechanism connected pivotally to one of the link structures, to exert a moment arm force automatically moving the link structures through the in-line position to a locked over-center position. It is the compressible spring mechanism which maintains the link structures in the locked over-center position and positively resists inadvertent movement of these link structures out of that locked position. At the same time, the same spring mechanism positively forces the link structures and attachment arm to folded position, once the link structures have been moved back from the over-center locked position and through the in-line position.

It is a prime object of the present invention to provide an attachment frame which can be very readily and easily moved from a folded position to a spread locked position, and back once again.

It is a further object of the invention to provide a structure of the character described which incorporates spring mechanism for positively moving the link structures to over-center locked position and maintaining them there, while also being operative to restore them to folded position once they have been easily lifted by hand out of the locked position. To accomplish this, the spring mechanism which is employed must exert force through opposed moment arms.

Another object of the invention is to provide a hand truck with a reliable auxiliary support structure which is automatically locked in spread position, and will not inadvertently be left in a position in which it could collapse when used to support heavier or bulkier loads that are not normally carried upright on a hand truck.

A further object of the invention is to provide a versatile, economically manufactured hand truck which does not depend upon mechanical latches or friction to maintain the auxiliary support frame in either of its positions.

Other objects and advantages of the invention will become apparent by reference to the following specification and to the drawings.

THE DRAWINGS

FIG. 1 is a side elevational view of my improved hand truck showing the attachment frame in locked position ready to assist in handling a considerable load, the broken lines indicating the folded position of the frame;

FIG. 2 is a similar view illustrating the folded-in position in which the wheels of the attachment frame are disposed adjacent to the main frame above the wheel axle;

FIG. 3 is a fragmentary, sectional plan view, on an enlarged scale, taken on the line 3—3 of FIG. 1; and FIG. 4 is a fragmentary, rear elevational view taken on the line 4—4 of FIG. 1, with some of the parts omitted in the interests of clarity.

Referring now more particularly to the accompanying drawings, the hand truck illustrated is shown as comprising the usual rubber-tired wheels 10, rotatably mounted on a dead axle 11. Side brackets, generally designated 12, and fixed to the dead axle 11, such as shown in applicant's U.S. Pat. Nos. 4,762,333 and 5,042,827 which are incorporated herein by reference, extend forwardly from the axle 11 toward a generally rectangular open main frame, generally designated F, to fixedly connect thereto. The side brackets 12 are connected to the side rails 13 in a manner described in more detail in applicant's U.S. Pat. No. 3,997,182, which is also incorporated herein by reference, and may be considered to be a part of the main frame. The main frame F has a load-supporting nose member 14 which may connect to the parallel vertical side rails 13 in the manner described in U.S. Pat. No. 3,997,182. The side rails 13 are preferably formed of extruded aluminum of a predetermined configuration, and incorporate cross braces 15 which span them at vertically spaced intervals. At their upper ends the side rails 13 have a conventional handle 6 which projects rearwardly and is grasped by the user to propel the hand truck in a vertically inclined, load transporting position.

To aid the user in supporting bulkier and/or heavier loads in a more tilted position, an attachment frame, generally designated 17, is provided to move from the solid line position shown in FIG. 1 to the folded position shown in FIG. 2. The frame 17 may comprise a pair of side rails 18 and 19 connected at their upper and lower ends by cross members 20 and 21. At their lower ends, each of the leg side rails 18 and 19 carries a caster wheel assembly, generally designated CW. As FIG. 4 particularly illustrates, the members 18 and 19 have rearwardly projecting side webs 18a and 19a, and the upper ends of the members 18 and 19 narrow as at 18b and 19b so that they can fit between the hand truck frame side rails 13. The upper terminal ends of the members 18 and 19 are then pivotally secured to the frame members 13 by pins or bolts 22 which extend through bores in bushing members 23 disposed within the rear channels 13a provided in the side rails 13.

Also pivotally secured to the side rails 13, at a spaced distance downwardly from the pins 22, are the legs 24a of the generally U-shaped frame link 24. As shown in FIG. 3, bolts or pins 25a join the terminal portions of the legs 24a pivotally to the side rails 13, bushings 26 within channels 13a being provided with bores to accommodate the bolts 25a as shown. Link 24 also incorporates a rear central hinge joint 24b having projecting leg portions 24c which intermesh with the like projecting leg portions 27c provided by a cooperable hinge joint 27b on a generally U-shaped leg link 27 having leg portions 27a A pin 25 is provided to pivotally connect the hinge joints 24b and 27b. Leg portions 24c have stop surfaces 24d which are engaged by legs 27c to prevent the links 24, 27 from moving downwardly beyond the position in which they are shown in FIG. 1.

Bracket clevises 28 affix to each of the attachment leg side members 18 and 19 and project laterally inwardly or forwardly to receive the terminal ends of the legs 27a and pivotally mount them by means of pivot pins or bolts 29 fixed to and spanning brackets 28. Laterally inwardly or forwardly of the pins 29, when the leg attachment is in the FIG. 1 spread position, are pins 30 to which the piston rods 31 of commercially available gas springs, generally designated 32, are connected. At their upper ends, gas springs 32 have mounting eyes 33 which are pivotally received on the pins 34 carried by the leg side channel members 18 and 19. Mounted on the hinge portion 27b of leg link 27 is a knob 35, having a stem 35a connected centrally to the leg link 27.

As FIG. 1 indicates, when the leg attachment is in the FIG. 1 position with the leg attachment 17 in its operative position, the links 24 and 27 are in an over-center position with respect to pin 25. The pair of gas springs 32 at each side of the attachment leg 17 both incorporate a gas under pressure which, with piston rods 31 in their outer positions, resists compression of the piston rods 31. This resistance to upward movement of the link 27 is exerted for each rod 31 through a moment arm "x", and will retain the links 24–27 in the locked position shown in FIG. 1 during load transporting operation of the hand cart.

Similarly, in FIG. 2, the same gas springs 32 are shown operating through moment arms "y" on the opposite side of pins 29 with piston rods 31 also in their outer positions to maintain the leg attachment 17 in the folded position. In neither extreme position of the leg attachment 17 are the piston rods 31 fully mechanically extended so undue stress on the gas springs 32 is avoided.

THE OPERATION

The hand cart illustrated is, of course, operable in the normal way to carry loads on nose plate 14, with the loads leaning back against side rails 13. When more assistance is required to handle heavier and/or bulkier loads, the resistance to movement of the attachment leg assembly 17 effected by springs 32 can be overcome by grasping the rail 21 as a handle and pulling outwardly on the leg attachment 17. As the attachment leg assembly 17 moves outwardly away from the frame rails 13, the force exerted through moment arms "y" decreases to the point at which it disappears when the pins 29 and 30 are in vertical alignment. The relative positions of the pins 29 and 30 are so chosen that this occurs shortly before the pin 25 connecting links 24 and 27 passes through the "dead center" line "z". By the time this occurs, the pins 30 have swung over beyond pins 29. As the pins 30 swing beyond the vertically aligned positions, the gas springs 32 take over, and operating through the increasing moment arms "x" automatically force the links 24 and 27 through dead center position to the over-center position shown in FIG. 1 in which the ends of legs 24c butt against and are positively stopped by the edges 24d. The links 24 and 27 remain locked in this position by the gas springs 32 during load transport and their position cannot be changed by load forces. They can be removed from locked position by pulling upwardly on the knob 35 to bring the pivot 25 through the "in line" or dead center position of the links to a position slightly above dead center. As this occurs, piston rods 31 are forced into the cylinders 32 until pins 30 come into vertical alignment with the pins 39. As the pins 30 swing forwardly past the pins 29, the piston rods 31 are gradually permitted to extend and operate through the increasing moment arms "y" to force the attachment arm assembly 17 back to the folded position shown in FIG. 2. Thus, the same gas springs 32 accomplish dual functions in that they force the links 24 and 27 to a locked over-dead center position during spreading movement of the leg attachment 17 to assure the locked position is reached, while, operating also to force the return of the leg assembly 17 to folded position, once the knob 35 is lifted. Beyond that, the gas springs 32 exert a force through their moment arms "y" and "x" to respectively maintain the leg attachment 17 in the folded position, and in the spread position.

It is to be understood that the embodiments described are exemplary of various forms of the invention only and that the invention is defined in the appended claims which contemplate various modifications within the spirit and scope of the invention.

I claim:

1. In a hand propelled, load carrying hand truck:
   a. an upright main frame, including brace-connected side rails, with a handle part at its upper end and a wheel and axle assembly at its lower end to support it for travel;

b. a forwardly extending nose platform for the lower end of the main frame for supporting a load thereon which rests back against the main frame when the main frame is in vertically rearwardly tilted position;

c. an attachment frame, having at least one ground engaging member at its lower end, pivotally connected near its upper end to an upper portion of said main frame for movement out away from the general plane of said main frame to a spread divergent position with respect thereto;

d. a rearwardly extendible first link structure having a pivot pivotally connecting said first link to said main frame at a location spaced downwardly from the pivotal connection of the attachment frame to the main frame;

e. forwardly extendible second link structure having a pivot pivotally connecting said second link structure to said attachment frame;

f. a swingable link pivot, in a first position in front to rear alignment with both said pivots in an alignment plane, pivotally connecting said first link structure to said second link structure for movement from a position in which said link pivot is in a second position on one side of said alignment plane when the attachment frame is folded to said main frame through said alignment plane to an over-center third position in which said link pivot is on the opposite side of said alignment plane; and g. force exerting, compressible spring means, having first spring pivot connecting said spring means to one of said main frame and attachment frame at a first point and a second spring pivot connecting said spring means to one of said link structures at a second point lying inboard in a front to rear direction of the pivot of said one of said main frame and attachment frame when the link pivot is in said third position and said attachment frame is in spread position for exerting a moment arm form moving said link pivot through said alignment plane, to said third over-center position and positively resisting inadvertent movement of said link pivot out of said third position, while positively forcing said link pivot to said second position and said link structures and attachment arm to folded position once said link pivot has been moved back from said third over-center position through said plane of alignment.

2. The hand truck set forth in claim 1 wherein said spring means is a gas spring mechanism.

3. The hand truck set forth in claim 2 wherein said gas spring mechanism is connected to said second link structure near the rear end thereof to move from a position exerting a force forwardly of the pivot of said second link structure when said link pivot moves through said alignment plane and carries the front end of said second link toward said attachment frame to a position exerting moment arm force rearwardly of said pivot of said second link structure to normally maintain said attachment frame in folded position.

4. The hand truck set forth in claim 3 in which said gas spring mechanism is compressed when said link pivot is moved back from third position through said alignment plane, and then is permitted to expand.

5. The hand truck of claim 2 wherein forwardly projecting bracket means is a part of said attachment frame and pin means thereon functions to pivotally attach said gas spring mechanism to said second link structure forwardly of said attachment frame.

6. The hand truck of claim 5 in which said pin means are so positioned that said gas spring mechanism exerts its force through a lesser moment arm when it is resisting movement of said link pivot out of said third position than when it is resisting movement of said attachment frame away from folded position.

7. The hand truck of claim 4 in which said gas spring mechanism comprises a pair of spaced apart gas springs.

8. The hand truck of claim 4 in which handle means is provided on said second link structure to facilitate moving said link pivot up from over-center locked position.

9. The hand truck of claim 4 in which said link structures have legs with parts in intermeshed position which are connected by a hinge pin, and said leg parts have stop surfaces which interengage to prevent further movement of said link pivot when it has moved to third position.

10. A method of operating a hand propelled hand truck having an upright main frame, including brace-connected side rails, with a handle part at its upper end; a forwardly extending nose platform for the lower end of the main frame for supporting a load thereon which rests back against the main frame when the main frame is in vertically rearwardly tilted position; and a wheel and axle assembly connected to the lower end of the main frame to support it for travel; there being an attachment frame, having at least one ground engaging wheel at its lower end, pivotally connected near its upper end to an upper portion of said main frame for movement out away from the general plane of said main frame to a spread divergent position with respect thereto; rearwardly extendible first link structure having a pivot pivotally connecting said first link structure to said main frame at a location spaced downwardly from the pivotal connection of the attachment frame to the main frame; forwardly extendible second link structure having a pivot pivotally connecting said second link structure to said attachment frame; a swingable link pivot in a first position in front to rear alignment with both said pivots in an alignment plane pivotally connecting said first link structure to said second link structure for movement from a position in which said link pivot is in a second position on one side of said alignment plane when the attachment frame is folded to said main frame through said alignment plane to an over-center third position in which said link pivot is on the opposite side of said alignment plane; and force exerting compressible spring mechanism having a first spring pivot connecting said spring mechanism pivotally to one of said main frame and attachment frame at a first point and a second spring pivot connecting said spring means to one of said link structures at a second point lying inboard in the front to rear direction of the pivot of said one of said main frame and attachment frame when the link pivot is in said third position and said attachment frame is in spread position; comprising the steps of:

a. pulling the attachment frame outwardly against the restraining force exerted by said spring mechanism toward spread position and moving the link pivot toward said alignment plane while moving said first and second link structures from a folded position toward a more in-line position;

b. by pulling the attachment frame outwardly, moving the second spring pivot from an initial position on one front to rear side of the pivot of said one of the main frame and attachment frame in which said spring mechanism exerts force through a moment arm to resist unfolding of the first and second link structures to a position on the other front to rear side of said second spring pivot; and c. thereby releasing the force of said spring mechanism through a moment arm sufficient to move said link pivot through said alignment plane to over-center third position, and to resist movement of said link pivot back out of said third position.

11. The method set forth in claim 10 comprising moving said link pivot manually up from over-center through said alignment plane and thereby moving the second spring pivot back to initial position to cause said spring mechanism to exert a force through a moment arm which restores said attachment frame to folded position.

* * * * *

UNITED STATES PATENT AND TRADEMARK OFFICE
CERTIFICATE OF CORRECTION

PATENT NO. : 5,207,439
DATED : May 4, 1993
INVENTOR(S) : Carl N. Mortenson

It is certified that error appears in the above-identified patent and that said Letters Patent is hereby corrected as shown below:

Column 5, line 32, after "having" insert -- a --;

line 41, change "form" to -- force --.

Signed and Sealed this

Eleventh Day of January, 1994

*Attest:*

BRUCE LEHMAN

*Attesting Officer*  *Commissioner of Patents and Trademarks*